United States Patent

[11] 3,591,098

| [72] | Inventor | Robert C. McShirley<br>6535 San Fernando Road, Glendale, Calif. 91201 |
|---|---|---|
| [21] | Appl. No. | 798,337 |
| [22] | Filed | Feb. 11, 1969 |
| [45] | Patented | July 6, 1971 |

[54] DENTAL AMALGAM PREPARING APPARATUS
5 Claims, 8 Drawing Figs.

[52] U.S. Cl............................................ 241/137, 241/199, 241/285, 259/58
[51] Int. Cl................................................... B02c 17/08, B02c 19/08
[50] Field of Search.......................................... 241/33, 137, 176, 177, 182, 184, 199, 285; 259/58, 82, DIG. 20

[56] References Cited

UNITED STATES PATENTS

| 1,144,272 | 6/1915 | West | 241/137 X |
|---|---|---|---|
| 2,518,758 | 8/1950 | Cook | 259/108 |
| 2,937,814 | 5/1960 | Joisel | 241/137 X |
| 3,170,648 | 2/1965 | McShirley | 241/199 X |
| 3,222,037 | 12/1965 | Thiel | 241/184 X |

FOREIGN PATENTS

| 436,534 | 10/1935 | Great Britain | 241/137 |

*Primary Examiner*—Donald G. Kelly
*Attorney*—Spensley, Horn and Lubitz

ABSTRACT: Improved apparatus for preparing dental amalgam from pellets of compressed metal alloy powder and mercury including elements operative to pulverize the pellet in a container before the mercury is added into the same container and then is operative to both mix the mercury with the powder and then to effect a mulling action on the resulting amalgam so that the pellet of amalgam is ready for installation in the creation of a dental restoration. The illustrated embodiment includes duplicate containers so that while pulverizing action is being performed in one container, the powder resulting from a previously pulverized pellet is being combined with mercury in the performance of the mixing and mulling actions.

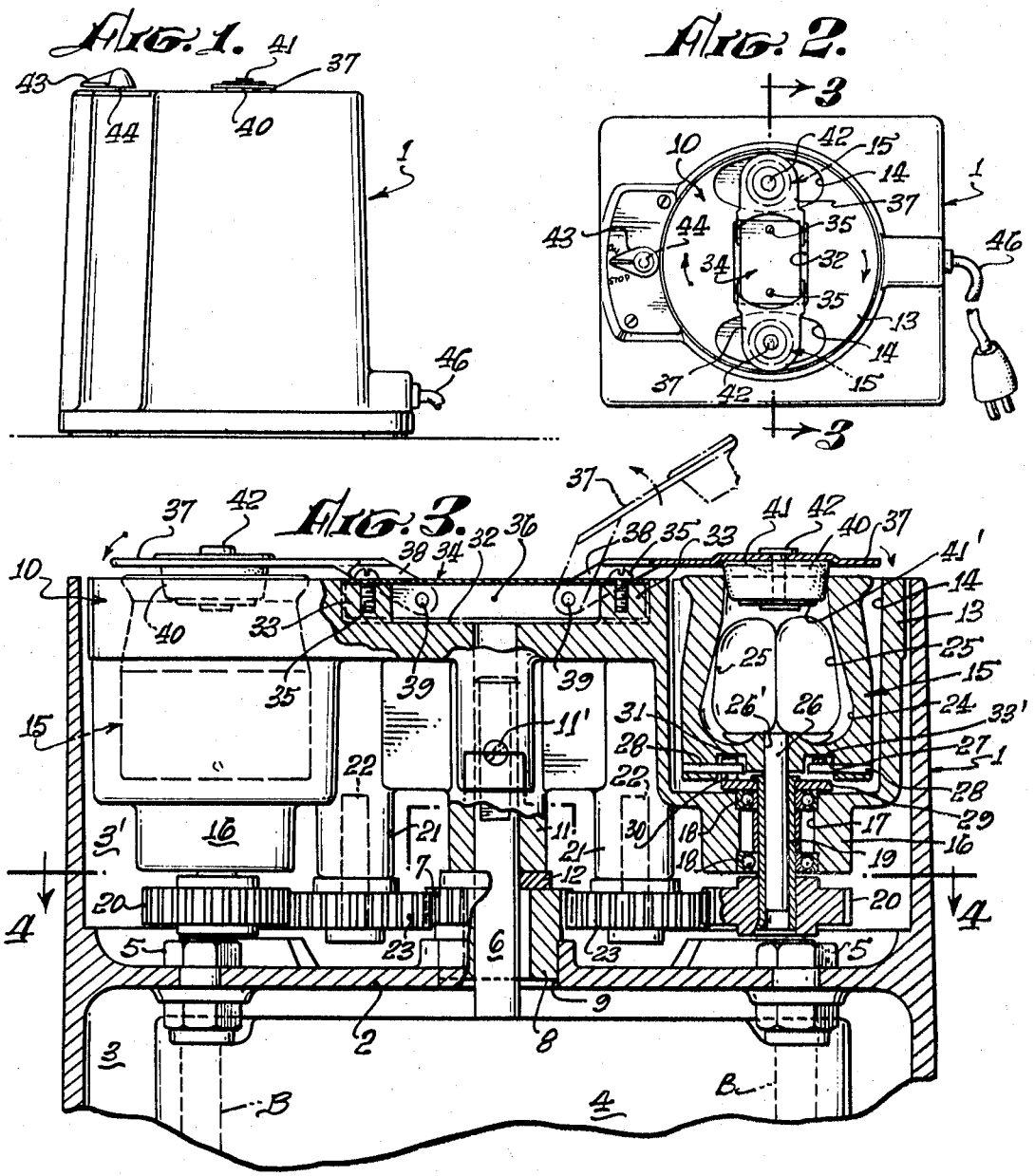
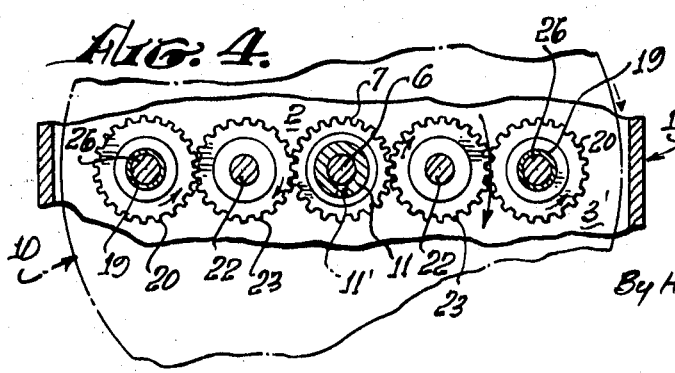

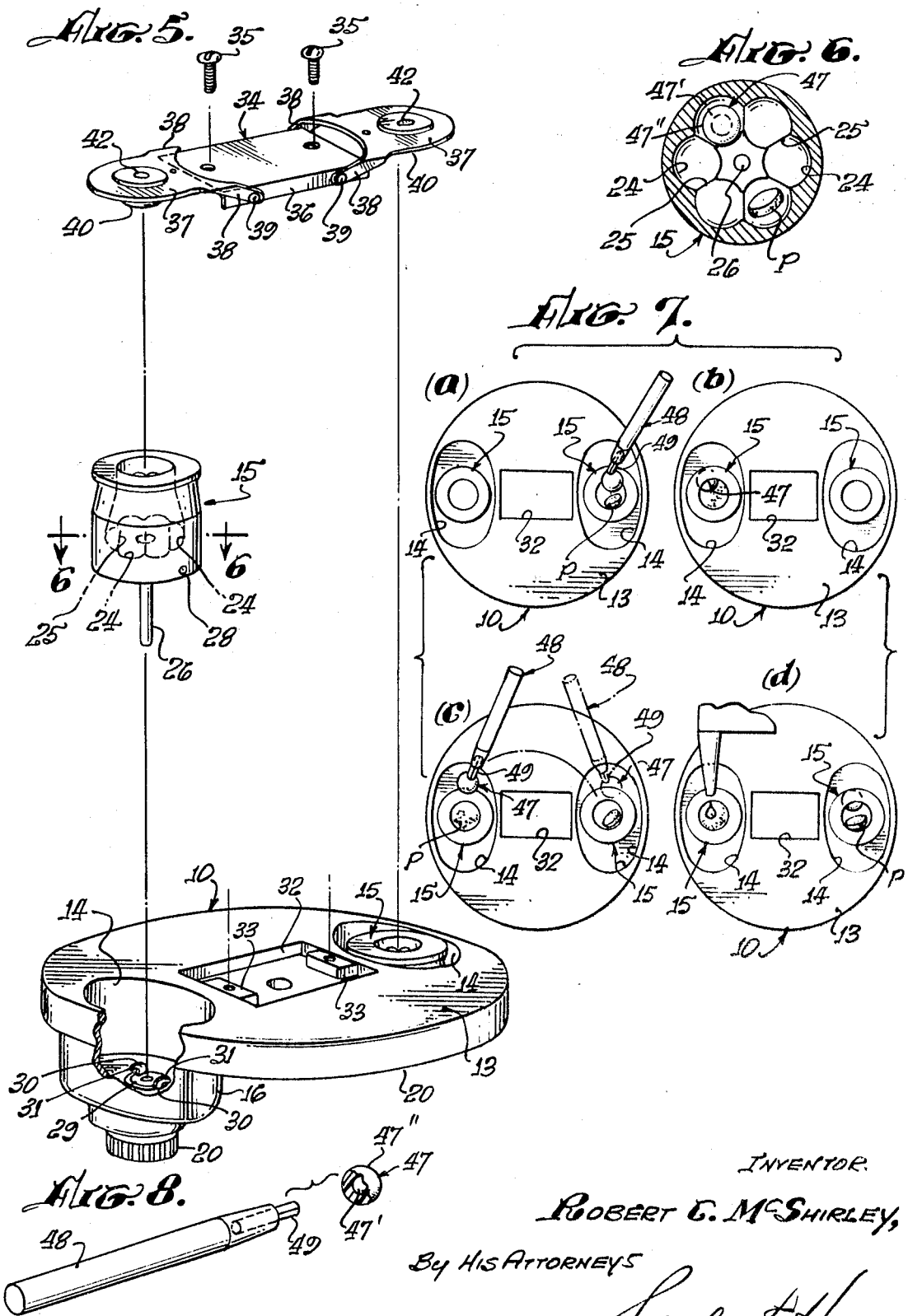

3,591,098

DENTAL AMALGAM PREPARING APPARATUS

BACKGROUND OF THE INVENTION

1. Field of the Invention

The invention relates to dental amalgam producing apparatus of the type employing the effect of centrifugal force both to achieve the pulverizing of the pellets of metal alloy powder and the mixing of mercury with the powder and the mulling of the resulting amalgam.

2. Prior Art

The most pertinent prior art known to applicant is the apparatus disclosed in his prior U.S. Pat. No. 3,170,648 granted on Feb. 23, 1965.

SUMMARY OF THE INVENTION

The above-identified prior patent of applicant dealt with apparatus for forming dental amalgam from metal alloy powder and mercury. In recent years, the metal alloy powder used for dental amalgam has been furnished in increasing amounts in the form of tightly compressed pellets of predetermined volume thereby making possible the more accurate measurement of the alloy powder and additionally, when the pellet is pulverized, providing a powder in which the grains are, for the most part, not adversely affected by the surface thereof being oxidized. In the illustrated apparatus there are two diametrically opposite cups which are rotated in a rotating carrier and which are generally similar to the single cup of the said prior art machine. Thus, while one of the cups may be employed to pulverize a pellet of alloy powder, the other cup may be employed to complete the formation of the amalgam by mixing the powder of a previously pulverized pellet with mercury and effecting the desirable mulling action on the amalgam thus formed. This provides a means for forming successive batches of amalgam in a very few seconds thus giving the dentist the advantage of additional time in inserting and carving the restoration.

BRIEF DESCRIPTION OF THE DRAWINGS

The drawings, which form a part of the specification following illustrate a presently preferred embodiment of the invention, and in said drawings:

FIGS. 1 and 2 are, respectively, side elevational and top plan views of an apparatus for forming dental amalgam constituting a presently preferred embodiment of the invention;

FIG. 3 is an enlarged scale, fragmentary, sectional view taken generally in the vertical plane containing the line 3—3 in FIG. 2;

FIG. 4 is a reduced scale, fragmentary, top plan view taken on the staggered line 4—4 of FIG. 3 and particularly showing the planetary gearing of the apparatus;

FIG. 5 is an exploded perspective view of the cup carrying head, the associated cups, and the centrifugal force responsive cover means of the invention;

FIG. 6 is an enlarged cross-sectional view through the cup as indicated on line 6—6 of FIG. 5;

FIG. 7 is a schematic representation of the successive steps followed in a typical use of the apparatus; and, FIG. 8 is a perspective view, partly in section, of the pestle element and the tool for removing it from the cup components of the machine, the pestle being shown in disproportionate larger scale for the clearness of illustration.

DETAILED DESCRIPTION OF THE ILLUSTRATED EMBODIMENT OF THE INVENTION

Referring to the drawings, the illustrated embodiment of the invention includes a hollow frame member 1 open at its upper and lower ends and having a transverse partition 2 dividing the interior of the frame into a lower cavity 3 and an upper cavity 3'. A vertical shaft electric motor 4 is disposed in the cavity 3 and is secured to the underside of the partition 2 by nuts 5 engaging extensions of the motor frame bolts B. The shaft 6 of the motor projects through the partition and has bearing engagement in an axial bore in a stationary sun gear 7 having a depending hub 8 secured in a recess 9 in the upper side of the partition 2.

The shaft 6 extends upwardly almost to the plane defining the top of the cavity 3' and the mixing cup carrying and actuating head component 10 includes a depending hub portion 11 fixed to the upper end of the motor shaft for rotating therewith by a setscrew 11', the lower end of the hub 11 engaging the upper end face of a thrust washer 12 on the upper end of the gear 7 to absorb end thrust on the motor shaft 6. The body portion 13 of the head 10 is generally of disclike configuration and of a diameter such that the edge thereof is spaced from the inner surface of the wall portion of the frame 1 which bounds the cavity 3'. At diametrically opposite points thereon, the frame 1, is provided with oval clearance cavities 14, 14 in which the material treating cups 15, 15 are removably received.

Below the bottom of each of said cavities 14, the head is provided with one each of a pair of depending cylindrical bosses 16, 16 each of which has a bore 17 extending vertically therethrough. The outer ends of said bores are counterbored to receive the outer races of ball bearings 18, 18 and the inner races of said bearings carry a sleeve 19 having a lower end extending through the lower one of said bearings and below a plane containing the lower face of the toothed portion of the gear 7. A planet gear 20 is mounted on said lower end of the sleeve 19 and is disposed with the teeth thereof in the same plane as the teeth of the sun gear 7. Between the hub 11 and each boss 16, the head component 10 includes a pair of depending bosses 21 each of which carries a stud 22 on which a planet gear 23 is freely rotatable, each of said gears 23 meshing both with the sun gear 7 and one each of the planet gears 20. Having reference to FIG. 4, it will be seen that as the head 10 is rotated in a clockwise direction by the motor, the planet gears 23, 23 rolling on the stationary sun gear 7 will be caused also to rotate in a clockwise direction and to impart counterclockwise rotation to the planet gears 20, 20 together with the sleeves 19 and the cups 15 carried thereby through driving means to be presently described.

Since the cups 15 are identical as is also the mounting and driving means therefor, a description of one will serve for both. The cups, or at least the mercury contacting surface thereof, are preferably formed of material with which the mercury will not combine in an amalgam, e.g., stainless steel. The side area of the interior of the cup is formed as a series of concave pockets 24 which decrease in depth as they approach the open end of the cup and said pockets are separated by ridges 25 formed by the junctures of adjacent pockets. A pin 26 depends from the underside of the cup in the axial line thereof, said pin having a diameter making a close fit with the interior of the sleeve and the upper end being shrink fitted or otherwise secured in an axial bore 26' in the bottom of the cup. The bottom surface of the cup is provided with an annular groove 27 spaced from and concentric with the pin 26 and at diametrically opposite points thereon, the sidewall of the cup carries a pair of horizontal pins 28, 28 which extend across the groove 27 at about the middepth of the groove.

Above the upper bearing 18, the sleeve 19 carries a washer 29 fixed thereto and the upper face of said washer carries diametrically opposite driving hooks 30, 30 which are located so as to enter the groove 27 and said hooks terminate in horizontal free ends 31, 31 disposed above the horizontal plane touching the upper sides of the pins 28, 28 and extending in the direction of rotation of the sleeve and washer abovedescribed, i.e., clockwise. Thus, it will be seen that when a cup is inserted with the pins 28, 28 thereof disposed in advance of the hooks 30, 30 in the counterclockwise direction upon a slight clockwise movement of the cup, the pins 28, 28 will engage the hook ends 31, 31, and thus when the head component 10 is rotated, the hooks impart rotation to the cup and the hook ends prevent the cup from being dislodged.

When the machine is stopped, a slight manual counterclockwise rotation of the cup will disengage the cup from the hooks to permit it to be lifted from the head and be tilted to discharge the contents.

The upper face of the body portion of the head 10 is provided with a centrally disposed, shallow, elongated, rectangular recess 32 having the major medial diameter thereof disposed coincident with a diametral line of the head containing the axial lines of the two cup driving sleeves and having bosses 33, 33 at each end thereof. A hinge base member 34, preferably formed of sheet metal overlies the recess and is secured to the head by screws 35, 35 threadedly engaging complementary holes in the bosses 33, 33. At each side thereof, the hinge base member is provided with a depending flange 36 spaced inwardly from the respective sidewalls of the recess and terminating somewhat short of the recess end walls. The ends of these depending flanges serve as mounting means for a pair of hingedly mounted cover members 37, 37 each being formed with a pair of diagonally downwardly extending leg portions 38, 38 which straddle the adjacent ends of the hinge base member and are pivoted to the respective ends of the flange 36, 36 within the recess 32 by rivets or the like 39, 39. The free ends of these cover members, when in horizontal position, extended over the two cups and each cover member carries a weight member 40 of inverted frustoconical form which closely fits the open end of mouth of the cup associated therewith. Each of said weights is secured to the associated cover by a rivet 41 which extend through a washer 41', the weight and the cover and are riveted over on the upper surface of the cover as at 42. When the apparatus is at rest, the covers may be swung up to permit the cups to be removed and replaced but when the head component 10 is rotated by the motor at the speed of the motor, the resulting centrifugal force will cause the covers to swing down and the weights to enter the mouths of the cups. In this connection it will be noted that the hinge mounting of the covers is slightly below the plane of contact between the weight and the mouth of the cup. This insures that the centrifugal force will maintain the cover in contact with the cup edge but not to an extend of force that will interfere with the rotation of the cup or that will abrade either the weight or the cup.

The illustrated manual control for the apparatus is the same as that shown and described in the said prior patent of the present application and includes a head lever 43 mounted on a vertical shaft 44 which is oscillatable in a cover element 45 on the top surface of the frame 1. Below the cover, the shaft carries means operable, when the lever is moved in one direction, to close a normally open switch to supply current to the motor from a conductor 46 and when moved in the opposite direction, to operate a brake mechanism to bring the rotating motor and head to a quick stop.

Finally referring to FIG. 7, a typical use of the apparatus is illustrated in successive steps designated by the letters (a), (b), (c), and (d). Beginning with step (a) it will be assumed that both cups are in the machine and are empty. A pellet P of alloy powder is placed in one of the cups together with a pestle 47 comprising a steel ball 47' enclosed in a plastic coating 47" to prevent amalgamation with the ball and to prevent wear on the interior cup surface with consequent contamination of the amalgam to be produced. The apparatus is rotated a few seconds and the resulting ricochetting action of the pestle in the cup deriving from the combined centrifugal forces of the rotation of the head component 10 giving the cup an orbital travel in a clockwise direction as viewed in FIG. 4 and the independent counterclockwise rotation of the cup about its own axis causes the pellet to be reduced to a powder in a very few seconds as is indicated at step (b). The pestle is removed from the cup by a bar or rod 48 having a permanent magnet 49 in the end thereof and if a second batch of amalgam is to be produced immediately, the pestle is transferred to the other cup together with a second pellet as indicated at step (c). The desired quantity of mercury is also added to the powder in the first cup and the apparatus is rotated with the resultant production of the amalgam in the first cup in the same manner as in the apparatus of the said prior patent and the simultaneous reduction of the pellet in the second cup to powder ready for the addition of mercury when the next batch of amalgam is to be produced as when the dentist is making two or more restorations in a single treatment of a patient. It will be noted that the apparatus is not limited in use to making amalgam from pelleted alloy powder and that, if desired, the powder and mercury can be introduced into either or both cups and one or two batches of amalgam be produced.

I claim:

1. In an apparatus for producing a dental amalgam or other filling mixtures having a first surface which rotates in a first direction and at least one container, coupled to said first surface for rotation in a direction opposite to said first direction about an axis spaced apart from the axis of rotation of said first surface, the improvement comprising a cover means for covering said container mounted to said first surface such that rotation of said first surface causes said cover means to automatically cover said container.

2. The improvement defined in claim 1 wherein the centrifugal force on said cover means caused by the rotation of said first surface causes said cover means to cover said container.

3. The improvement defined in claim 2 wherein said cover means comprises a cover element hingedly mounted to said first surface radially inwardly from said container and a weighted free end for entering the open end of said container.

4. The improvement defined in claim 3 wherein the axis of a hinge, hingedly mounting said cover element to said first surface, is below the plane of contact between said weighted free end and the opening of said container.

5. The improvement defined in claim 4 wherein said apparatus includes two containers mounted diagonally on said first surface and a cover means for both container.